US008215421B2

(12) United States Patent
Schneider

(10) Patent No.: US 8,215,421 B2
(45) Date of Patent: Jul. 10, 2012

(54) WHEELCHAIR SAFETY, POWER AND SHADE DEVICE AND METHOD OF USE

(76) Inventor: David Kurt Schneider, Kennewick, WA (US)

( * ) Notice: Subject to any disclaimer, the term of this patent is extended or adjusted under 35 U.S.C. 154(b) by 588 days.

(21) Appl. No.: 12/417,159

(22) Filed: Apr. 2, 2009

(65) Prior Publication Data
US 2010/0253041 A1 Oct. 7, 2010

(51) Int. Cl.
*B60L 8/00* (2006.01)
(52) U.S. Cl. ..................... 180/2.2; 280/304.1
(58) Field of Classification Search .............. 280/304.1; 180/2.2, 65.31; 135/88.02, 88.03, 88.04; 297/184.15
See application file for complete search history.

(56) References Cited

U.S. PATENT DOCUMENTS

| | | | | |
|---|---|---|---|---|
| 3,404,915 A * | 10/1968 | De Souza Filho | ............... | 297/17 |
| 4,389,057 A * | 6/1983 | Richard, Jr. | ................ | 280/304.1 |
| 5,096,257 A * | 3/1992 | Clark | ....................... | 297/184.15 |
| 5,168,889 A | 12/1992 | Diestel | | |
| 5,203,363 A * | 4/1993 | Kidwell et al. | ................. | 135/90 |
| 5,205,308 A * | 4/1993 | Kendall et al. | .................. | 135/90 |
| 5,301,975 A * | 4/1994 | Rivera | ....................... | 280/304.1 |
| 5,489,002 A * | 2/1996 | Streiff | ........................ | 180/65.31 |
| 5,560,383 A * | 10/1996 | Fuller | ........................ | 135/88.01 |
| 5,725,062 A * | 3/1998 | Fronek | ........................... | 180/2.2 |
| 5,921,258 A * | 7/1999 | Francois | .................... | 135/88.03 |
| 6,102,479 A * | 8/2000 | Wallace | ........................ | 297/357 |
| 6,313,394 B1 * | 11/2001 | Shugar et al. | ................ | 136/244 |
| 6,586,668 B2 * | 7/2003 | Shugar et al. | ................ | 136/244 |
| 7,140,678 B1 * | 11/2006 | Grant | ....................... | 297/184.15 |
| 7,243,990 B1 * | 7/2007 | Wahl et al. | .............. | 297/184.15 |
| 7,316,450 B2 * | 1/2008 | Ayers et al. | .............. | 297/184.15 |
| 7,374,238 B2 * | 5/2008 | Lingwall | ................. | 297/184.11 |
| 7,585,020 B1 * | 9/2009 | Wahl, Jr. | ................. | 297/184.15 |
| 7,815,254 B2 * | 10/2010 | Reeb et al. | .............. | 297/184.15 |
| 2010/0193262 A1 * | 8/2010 | Zhao | .............................. | 180/2.2 |
| 2010/0253041 A1 * | 10/2010 | Schneider | ................. | 280/304.1 |

* cited by examiner

*Primary Examiner* — Jeffrey J Restifo

(57) ABSTRACT

The Safety, Power and Shade Device is a system usable with wheelchairs providing an upright and horizontal frame attachable by brackets to a wheelchair seat back. The frame allows for the installation of safety and illumination lights, a solar panel for supplemental recharging of an electric wheelchair battery and a mean of shelter or shade. The frame assembly is constructed to allow the horizontal frame to fold over and behind the wheelchair for a vertical relationship with the frame upright.

9 Claims, 8 Drawing Sheets

WHEELCHAIR SAFETY, POWER AND SHADE DEVICE AND METHOD OF USE

FIELD OF THE INVENTION

This invention relates to an apparatus for a wheelchair for safety, electrical power and shade.

BACKGROUND OF THE INVENTION

Wheelchair technology has been advanced through the use of light weight materials and electrical and other drive systems. Wheelchairs have become modes of transportation beyond the residential or retail environment. Wheelchairs are recognized as a principal means of transport for many including transit from residence to retail and also including off road use. Operation where other vehicular traffic may exist creates the need for enhanced safety, supplemental power and shade or shelter.

Shade or shelter apparatuses for wheelchairs and other applications are seen in U.S. Pat. No. 7,316,450 to Ayers, et al; U.S. Pat. No. 5,168,889 to Diestle; U.S. Pat. No. 5,301,975 to Rivera; U.S. Pat. No. 5,921,258 to Francois and U.S. Pat. No. 7,243,990 to Wahl.

The patents referred to herein are provided herewith in an Information Disclosure Statement in accordance with 37 CFR 1.97.

SUMMARY OF THE INVENTION

The Apparatus (1) provides a frame for use with a wheelchair. The frame, in the preferred embodiment, supports warning and illumination lights, a solar panel for supplemental charging of a wheelchair battery and shade and shelter. The frame is foldable for storage.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

Also seen is the frame upright/horizontal hinge (1100), the frame upright/horizontal hinge male member (1110), the frame upright/horizontal hinge male member pivot aperture (1114), the frame upright/horizontal hinge female member (1130), the frame upright/horizontal hinge female member pivot aperture (1134), the frame upright/horizontal hinge female member upright connection (1136), the frame upright/horizontal hinge slot (1138) and the frame upright/horizontal hinge pivot shaft (1140). Also illustrated is the frame wheelchair bracket (1300) showing the frame wheelchair bracket aperture (1305), the frame wheelchair bracket slot (1310), the frame wheelchair seat bracket (1320) and the frame wheelchair seat bracket apertures (1340).

Figure 5:
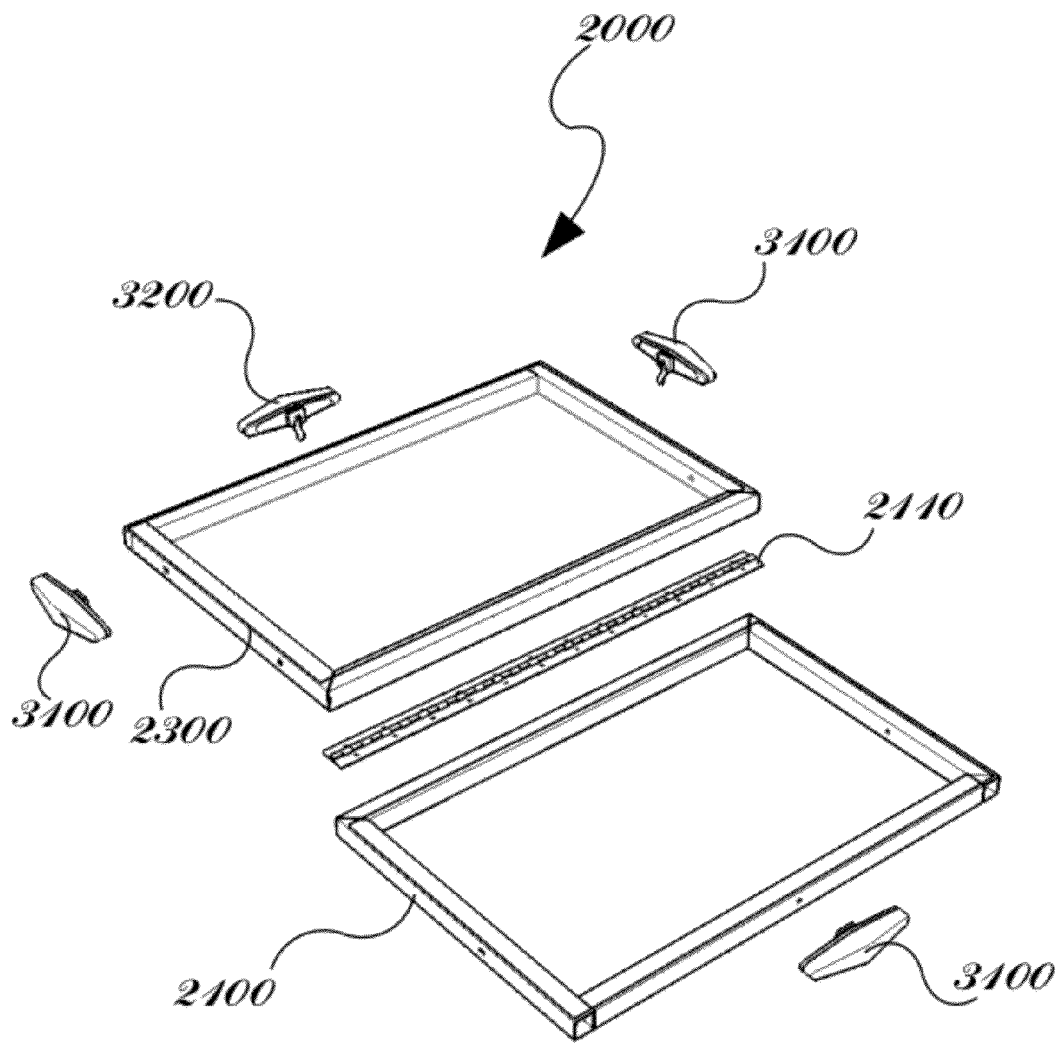

FIG. 5 is an exploded view of the frame horizontal (2000).

Figure 7:
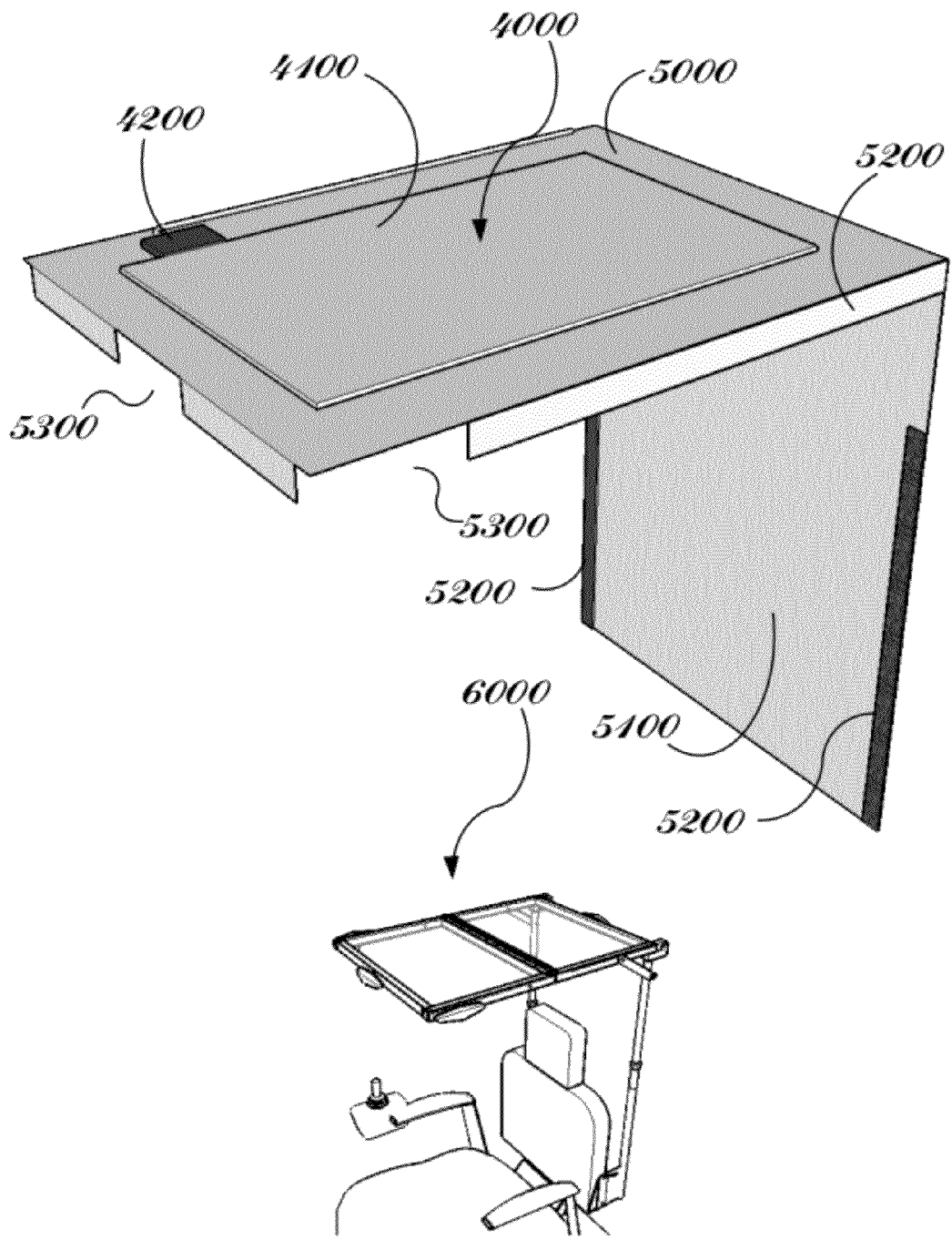
Figure 8:
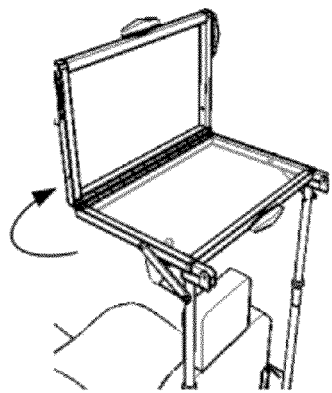
Figure 9:
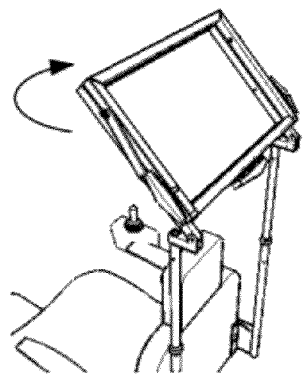
Figure 10:
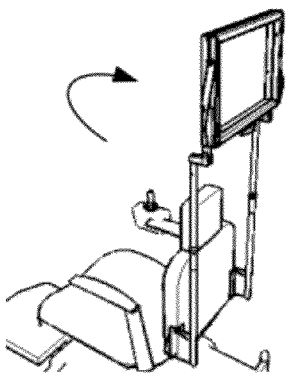
Figure 11:
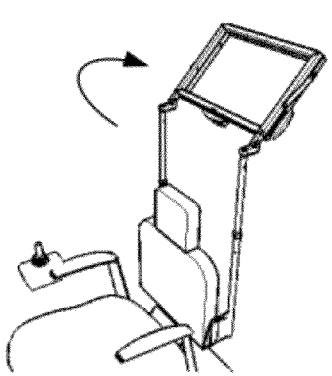
Figure 12:
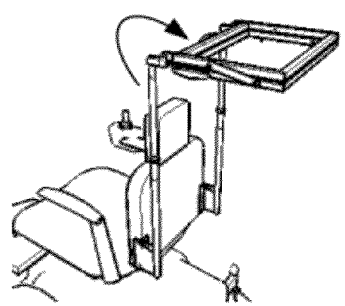
Figure 13:
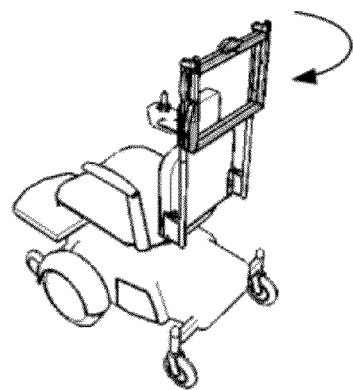

FIG. 7 illustrates the frame power system (4000) showing the frame power system solar panel (4100) and the frame power system electrical connections (4200). Also shown is the frame shade system (5000) with frame shade panel (5100) and frame shade panel connectors (5200).

FIGS. 8 through 13 illustrate the method of deployment and storage of the safety, power and shade device (1).

DETAILED DESCRIPTION

Figure 1:
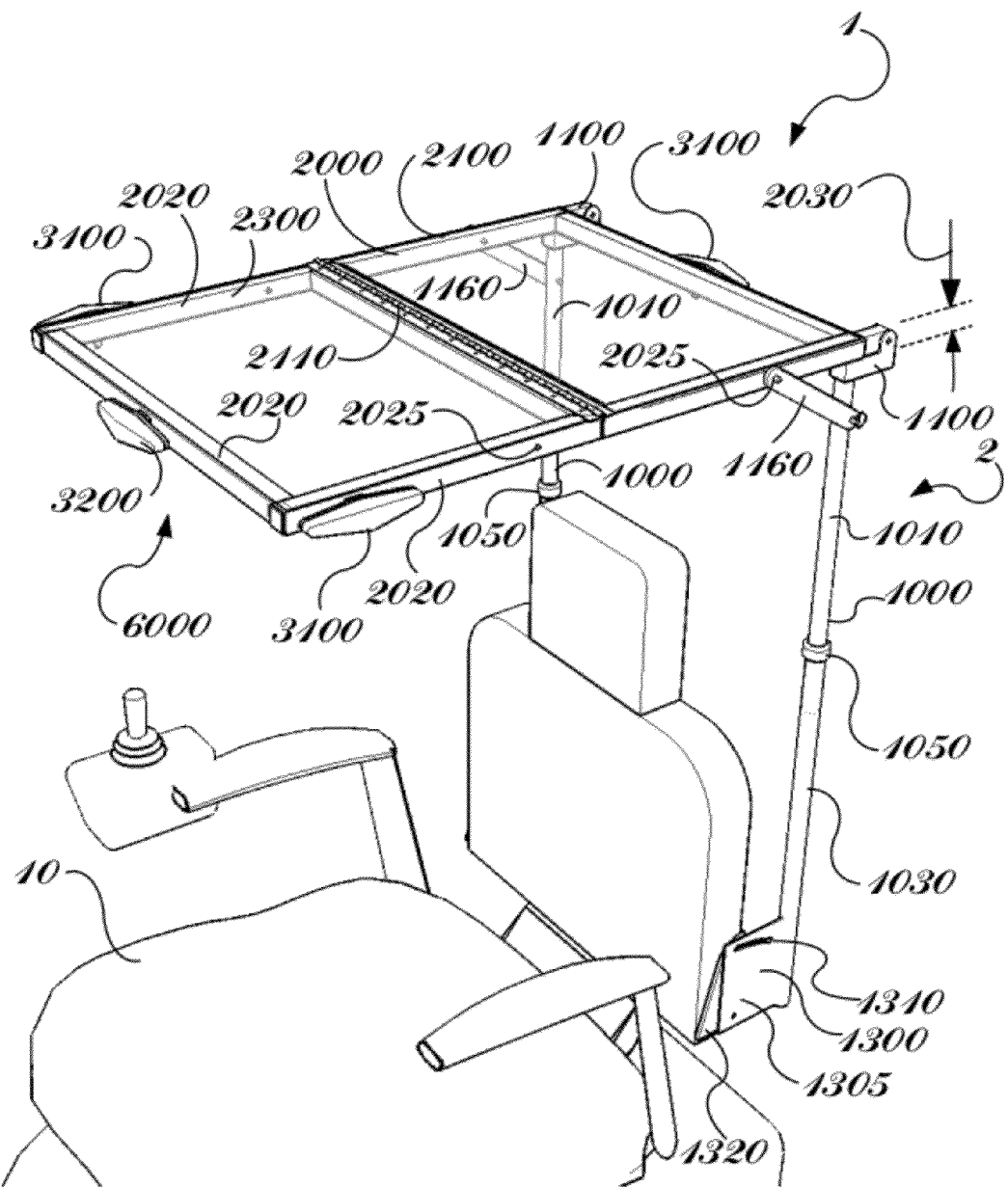
FIGS. 1 and 6 illustrates the safety, power and shade device (1) showing the frame (2) having frame upright (1000) comprising frame upright top members (1010), frame upright top member brace aperture (1025), frame upright bottom members (1030), and frame height adjustment (1050) comprised of means to fasten a rotating component to a shaft including but not limited to, split-rings, slotted inner and outer sleeves, ferrules and detents with aligned apertures. Seen is the frame upright/horizontal hinge (1100), the at least one frame upright/horizontal brace (1160), the frame wheelchair bracket (1300) and the frame wheelchair seat bracket (1320). Also seen is the frame horizontal (2000) with frame horizontal members (2020) and frame horizontal member apertures (2025). Illustrated is the frame horizontal member width or diameter (2030), the frame horizontal first unit (2100), frame horizontal hinge (2110) and frame horizontal second unit (2300). Also seen is the frame safety system (3000) with frame safety system caution lights (3100) and frame safety system vision lights (3200).
Figure 6:
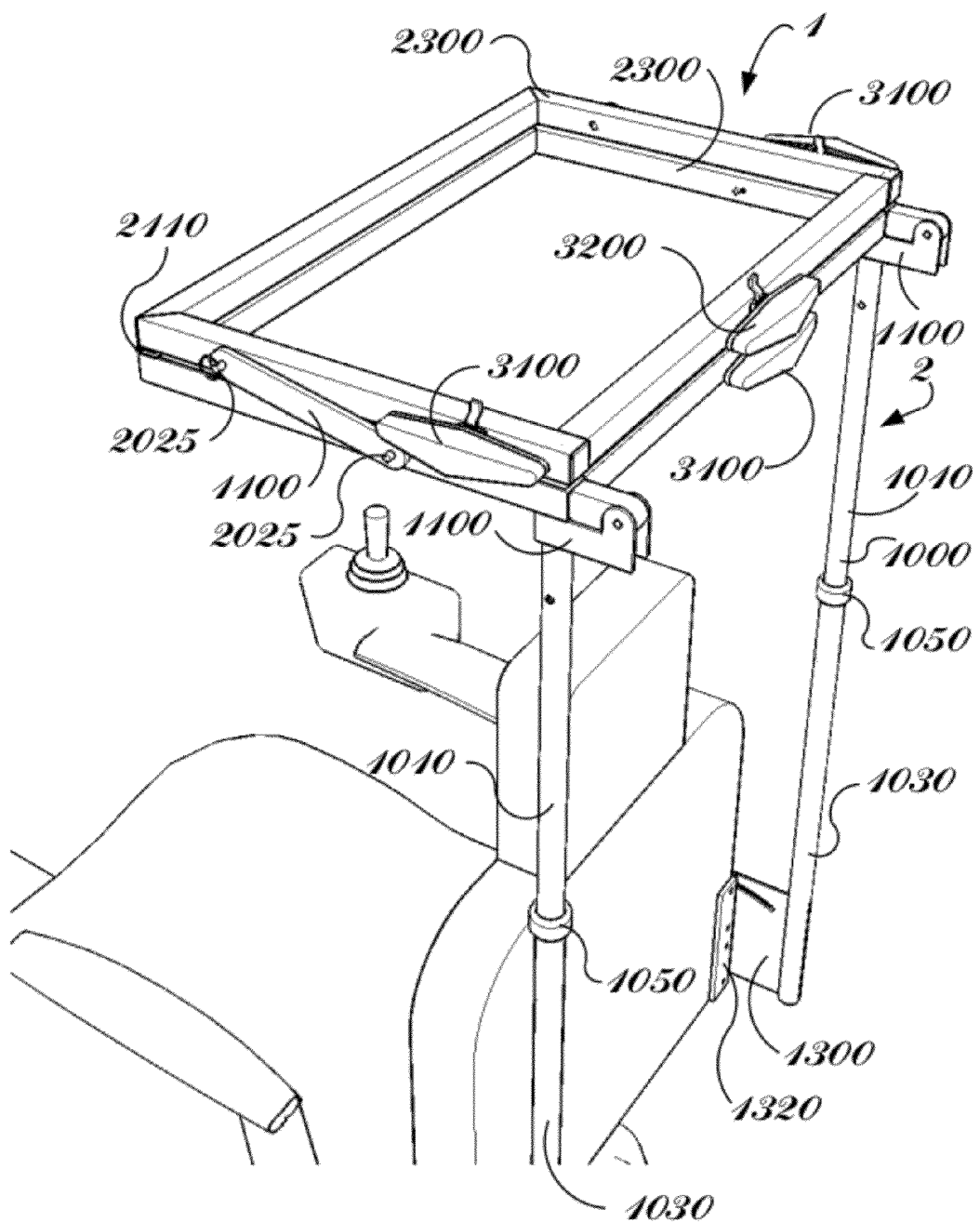

FIGS. 1, 5 and 6 illustrates the Safety, Power and Shade Device (1) showing a tubular frame (2) having at least two upstanding frame uprights (1000) and a generally horizontal frame horizontal (2000) pivotally interconnected with a frame upright/horizontal hinge (1100). It is recognized that the frame horizontal (2000) will pivot, for frame storage, about the frame upright/horizontal hinge (1100) to be folded over the frame uprights (1000) and downwardly to a generally vertical downwardly directed position generally parallel with the upstanding frame upright (1000).

Also illustrated is that each of the at least two frame uprights (1000) has a tubular frame upright top member (1010) and a tubular frame upright bottom member (1030). The frame upright top member (1010) is slidably received by the frame upright bottom member (1030) and retained at a specific height by a frame height adjustment (1050) comprised of a common method of fastening a rotating component to a shaft including, split-rings, slotted inner and outer sleeves, ferrules and or detents with aligned apertures in each of the frame upright top members (1010) and the frame upright bottom members (1030).

Also seen in FIGS. 1, 2, 5 and 6 is the frame upright/horizontal hinge (1100) comprised of a frame upright/horizontal hinge male member (1110), having a frame upright/horizontal hinge male member pivot aperture (1114), and a frame upright/horizontal hinge female member (1130). Also seen is a frame upright/horizontal hinge female member pivot aperture (1134). The frame upright/horizontal hinge male member pivot aperture (1114) is aligned with the frame upright/horizontal hinge female member pivot aperture (1134) and the two are pivotally interconnected.

Figure 2:
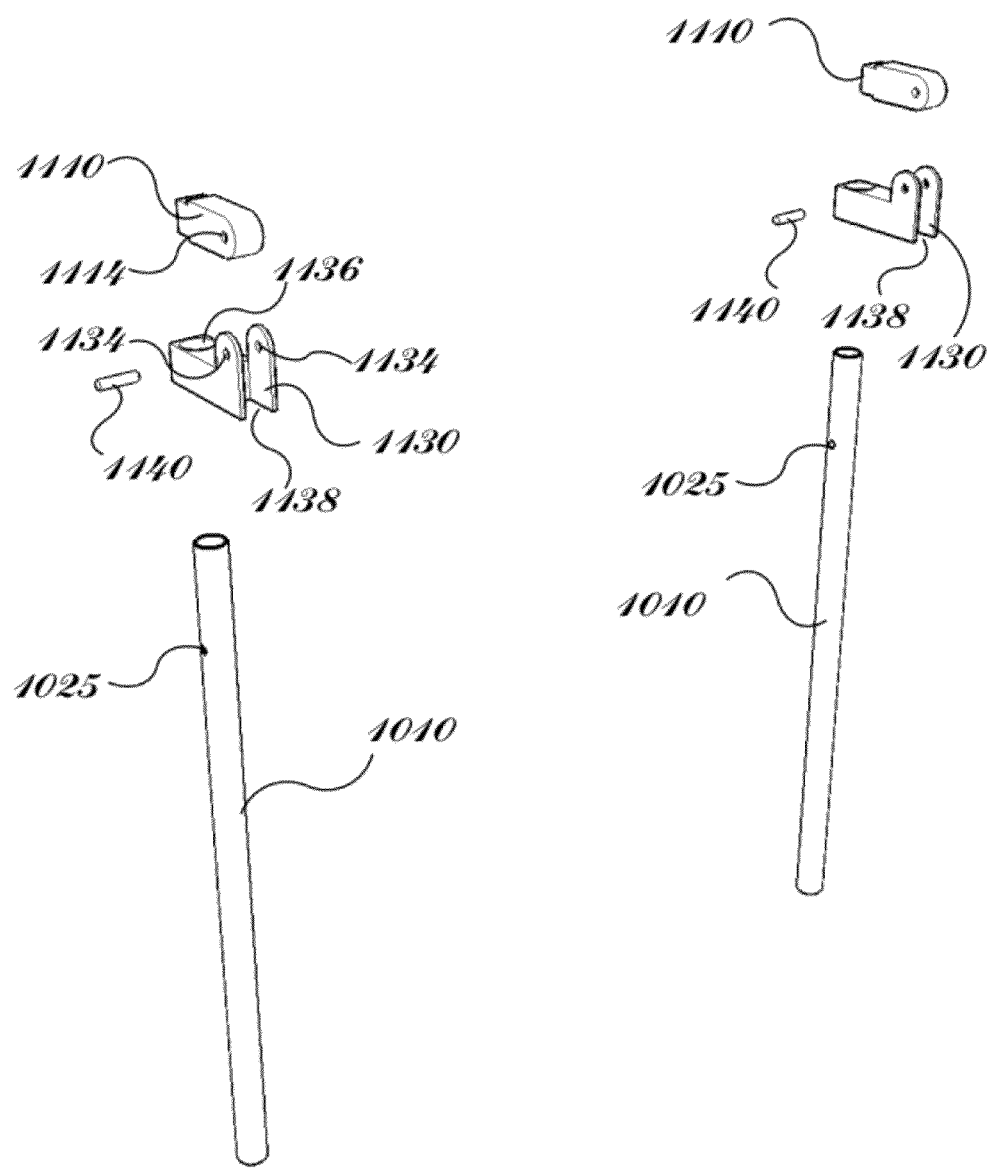
FIGS. 2, 3 and 4 illustrate the frame (2) with frame upright (1000) showing the frame upright top member (1010), frame upright top member brace aperture (1025), frame upright bottom member (1030), and frame height adjustment (1050).
Figure 3:
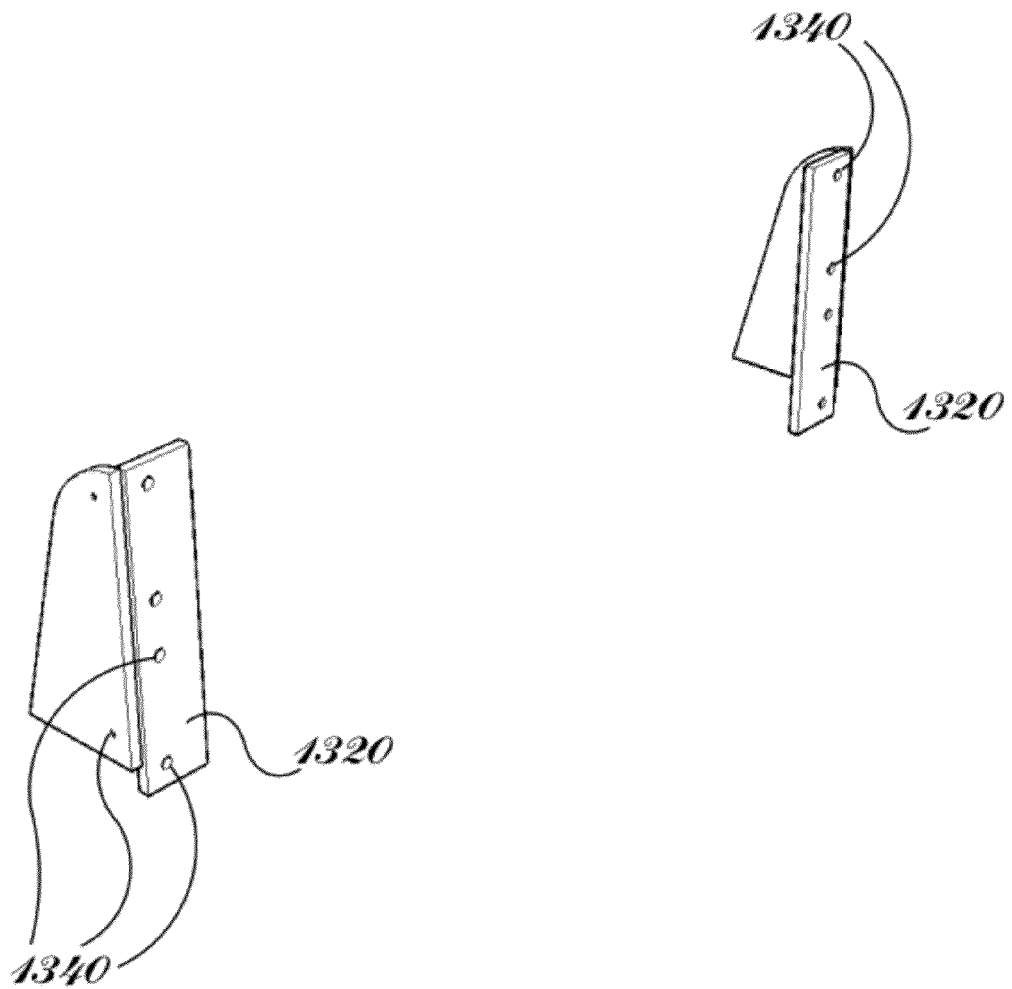

As seen in FIG. 2, the frame upright/horizontal hinge female member (1130) is generally orthogonal to the frame upright (1000) and has a frame upright/horizontal hinge female member upright connection (1136) comprising a tube sized to receive and be immovably affixed, generally by welding, to the frame upright (1000) at the point of interconnection with the frame horizontal (2000). The frame upright/horizontal hinge female member (1130) is outwardly extending from the frame upright (1000). The frame upright/horizontal hinge female member pivot aperture (1134) is distal to the frame upright (1000) by a distance of at least ½ of the frame horizontal member width or diameter (2030). The frame upright/ horizontal hinge female member pivot aperture (1134) extends upwardly from the frame upright/horizontal hinge female member (1130) by a distance of at least ½ of the frame horizontal member width or diameter (2030). A frame upright/horizontal hinge slot (1138) extends upwardly and downwardly and generally parallel with the frame upright (1000). The elongated frame upright/horizontal hinge male member (1110) is rigidly and immovably affixed, generally by welding, to and in alignment with the frame horizontal member (2020).

As shown in FIGS. 1, 5, 6 and 7, the frame horizontal (2000) is generally rectangular and is comprised of rigid tubular frame horizontal members (2020), having a frame horizontal member width or diameter (2030) comprising the width or diameter of the tube.

Rigidity to the deployed (6000) frame is further provided, as seen in FIGS. 1, 6 and 7, by at least one frame upright top member brace aperture (1025) and at least one frame horizontal member brace aperture (2025) which receive at least one elongated rigid frame upright/horizontal brace (1160). The frame upright/horizontal brace (1160) is removably connected by bolts, pins or detents to the frame upright (1000) at the at least one frame upright top member brace aperture (1025) and to the frame horizontal (2000) at the at least one frame horizontal member brace aperture (2025).

Figure 4:
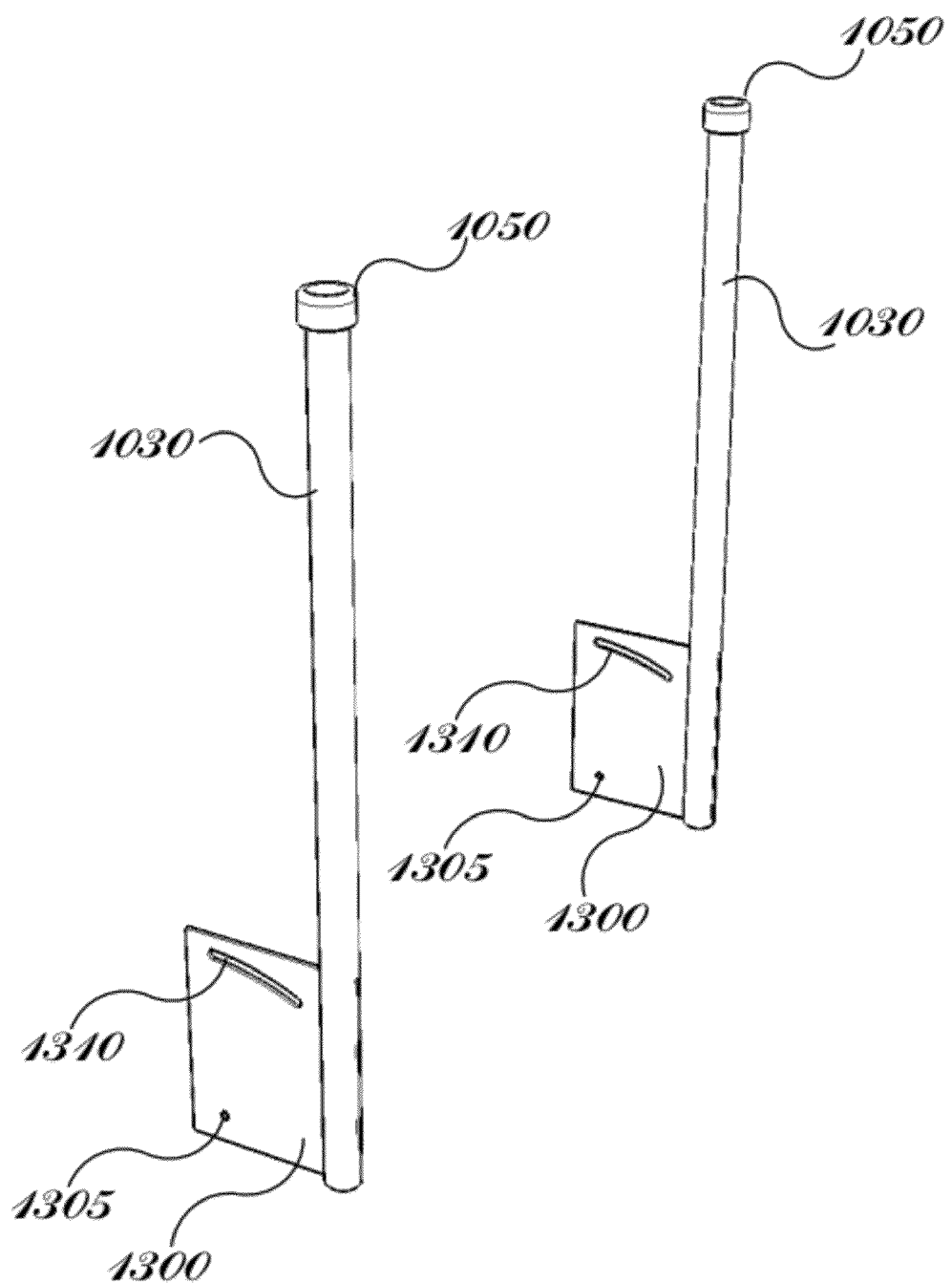

FIGS. 1, 3, 4 and 6 illustrate a frame wheelchair seat bracket (1320), having frame wheelchair seat bracket apertures (1340), which is rigidly affixed, generally by screws, to the lower side of each side of the upright portion of a wheelchair seat. Shown in FIG. 4 is at least one rigid planar frame wheelchair bracket (1300) which is rigidly and immovably affixed, general by welding, to each of the frame upright bottom members (1030) distal to the frame upright top member (1010). The frame wheelchair bracket (1300) extends outwardly and forwardly from the frame upright bottom member (1030) and is generally in alignment with the frame horizontal (2000). A frame wheelchair bracket aperture (1305), in a frame wheelchair bracket (1300) is distal to the frame upright bottom member (1030), is aligned with and pivotally and rotatably connected at at least one frame wheelchair seat bracket aperture (1340) to the frame wheelchair seat bracket (1320). A frame wheelchair bracket slot (1310) is formed in the frame wheelchair bracket (1300) and is aligned with and is slidably and adjustably connected at at least one frame wheelchair seat bracket aperture (1340), for angular adjustment of the frame upright (1000) to correspond to the angular position of a wheelchair seat back. Pivotally, rotatable, slidable and adjustable connections are provided, for example, by wing nut and bolt or allen nut and bolt and are immovably secured when angular adjustment is completed.

As seen in FIGS. 1, 5 and 6, it is seen that the frame horizontal (2000) consists of at least two frame horizontal members (2020) including a generally rectangular frame horizontal first unit (2100), proximal to the frame upright (1000), and a generally rectangular frame horizontal second unit (2300) which is rotatably and foldably interconnected to the frame horizontal first unit (2100) by a frame horizontal hinge (2110). There is at least one frame horizontal member brace aperture (2025) in the frame horizontal first unit (2100) and in the frame horizontal second unit (2300). The frame horizontal hinge (2100) is, in the preferred embodiment, generally provided by a piano hinge attached to both the frame horizontal first unit (2100) and the frame horizontal second unit (2300) to restrict downward movement of the frame horizontal second unit (2300) when unfolded and to allow the frame horizontal second unit (2300) to rotate and fold upwardly and on top of the frame horizontal first unit (2100) in preparation for storage. When the frame horizontal second unit (2300) is rotated and folded upwardly and on top of the frame horizontal first unit (2100), the frame upright/horizontal brace (1160) is disconnected from the at least one frame upright to member brace aperture (1025) and is removably connected by bolts, pins or detents at the at least one frame horizontal member brace aperture (2025) in the frame horizontal first unit (2100) and at the lat least one frame horizontal member brace aperture (2025) in the frame horizontal second unit (2300).

In the preferred embodiment the Device includes a frame safety system (3000), a frame power system (4000) and a frame shade system (5000). The frame safety system (3000) comprises at least one frame safety system caution light (3100), generally comprised of a flashing red or amber light, and at least one frame safety system vision light (3200), generally comprised of a white light illuminating the path ahead, immovably affixed to either or both of the frame horizontal (2000) and the frame upright (1000). The frame power system (4000) comprises at least one frame power system solar panel (4100), generally comprised of a solar panel, and frame power system electrical connections and circuits (4200) generally electrically interconnected with a wheelchair electrical system providing recharging power to the wheelchair battery. The frame shade system (5000) consists of at least one frame shade panel (5100) generally comprised of a transparent, translucent or opaque plastic or cloth fabric. Connections to secure the frame shade panel to and around the frame upright (1000) and frame horizontal (2000) include at least one frame shade panel connector (5200) generally comprised of a hook and loop interconnections, and at least one shade panel light or wiring aperture (5300) generally composed of apertures sized to receive frame safety system caution lights (3100) and or frame safety system vision lights (3200).

It will be appreciated that the Device can also be presented with each of the frame safety system (3000), the frame power system (4000) and frame shade system (5000) either individually or in several combinations.

A method of deploying and storing the safety, power and shade device (1) is also disclosed. From a position of frame deployment (6000), rotating upwardly the frame horizontal second unit (2300), rotating and folding the frame horizontal second unit (2300) on top of the frame horizontal first unit (2100). Disconnecting the frame upright/horizontal brace (1160) from the frame upright top member brace aperture (1025) and connecting the frame upright top member brace aperture (1025) at the frame horizontal member aperture (2025) in the frame horizontal second unit (2300). Rotating the frame horizontal second unit (2300) and frame horizontal first unit (2100) backwardly and down to a vertical position generally parallel with the frame upright (1000). Loosening the frame height adjustment (1050) and lowering the frame upright top member (1010) into the frame upright bottom member (1030). And finally, reversing the sequence of steps for redeployment (6000)

I claim:
1. A Safety, Power and Shade Device comprising:
a tubular frame having at least two upstanding frame uprights and a generally horizontal frame horizontal pivotally interconnected with a frame upright/horizontal hinge; each of the at least two frame uprights having a tubular frame upright top member and a tubular frame upright bottom member, the frame upright top member slidably received by the frame upright bottom member and retained at a specific height by a frame height adjust- ment at each of the frame upright top members and the frame upright bottom members, the frame upright/horizontal hinge comprising a frame upright/horizontal hinge male member having a frame upright/horizontal hinge male member pivot aperture, and a frame upright/horizontal hinge female member having a frame upright/horizontal hinge female member pivot aperture, the frame upright/horizontal hinge male member pivot aperture is aligned with and pivotally interconnected to the frame upright/horizontal hinge female member pivot aperture, the frame upright/horizontal hinge female member is generally orthogonal to an individual frame upright and has a frame upright/horizontal hinge female member upright connection comprising a tube sized to receive and be affixed to the individual frame upright at a point of interconnection with the frame horizontal, the frame horizontal is comprised of tubular frame horizontal members having a frame horizontal member that defines a width, the frame upright/horizontal hinge female member is outwardly extending from the individual frame upright, the frame upright/horizontal hinge female member pivot aperture is distal to the individual frame upright by a distance of at least ½ of the frame horizontal member width, the frame upright/horizontal hinge female member pivot aperture extends upwardly from the frame upright/horizontal hinge female member by a distance of at least ½ of the frame horizontal member; a frame upright/horizontal hinge slot extends upwardly and downwardly and generally parallel with the frame upright, the frame upright/horizontal hinge male member is rigidly affixed to, and in alignment with, the frame horizontal member, the frame horizontal configured to pivot, for frame storage, about the frame upright/horizontal hinge to be folded over the frame uprights and downwardly to a generally vertical downwardly directed position generally parallel with the at least two frame uprights.

2. A safety, power and shade device depending from claim 1 and further comprising:

at least one frame upright top member brace aperture and at least one frame horizontal member brace aperture; at least one elongated rigid frame upright/horizontal brace removably connected to the individual frame upright at the at least one frame upright top member brace aperture and to the frame horizontal at the at least one frame horizontal member brace aperture;

a frame wheelchair seat bracket, having frame wheelchair seat bracket apertures, is rigidly affixed to the lower side of each side of the upright portion of a wheelchair seat;

at least one rigid planar frame wheelchair bracket is rigidly and immovably affixed to each of the frame upright bottom members distal to the frame upright top member; the frame wheelchair bracket extends outwardly and forwardly from the frame upright bottom members and is generally in alignment with the frame horizontal;

a frame wheelchair bracket aperture in the frame wheelchair bracket is distal to the frame upright bottom member, is aligned with and pivotally and rotatably connected via an individual frame wheelchair seat bracket aperture to the frame wheelchair seat bracket; a frame wheelchair bracket slot is formed in the frame wheelchair bracket and is aligned with and is slidably and adjustably connected via another individual one frame wheelchair seat bracket aperture, for angular adjustment of the frame upright to correspond to an angular position of a wheelchair seat back to the frame wheelchair bracket.

3. A safety, power and shade device depending from claim 2:

the frame horizontal members including a generally rectangular frame horizontal first unit proximal to the frame upright and a generally rectangular frame horizontal second unit rotatably and foldably interconnected to the frame horizontal first unit by a frame horizontal hinge; at least one frame horizontal member brace aperture in the frame horizontal first unit and in the frame horizontal second unit;

the frame horizontal hinge provided by a piano hinge attached to both the frame horizontal first unit and the frame horizontal second unit to restrict downward movement of the frame horizontal second unit when unfolded and to allow the frame horizontal second unit to rotate and fold upwardly and on top of the frame horizontal first unit in preparation for storage;

when the frame horizontal second unit is rotated and folded upwardly and on top of the frame horizontal first unit, the frame upright/horizontal brace is disconnected from the at least one frame upright top member brace aperture and is removably connected to the at least one frame horizontal member brace aperture in the frame horizontal first unit and at the at least one frame horizontal member brace aperture in the frame horizontal second unit.

4. A safety, power and shade device depending from claim 3 and further comprising:

a frame safety system comprising at least one frame safety system caution light, generally comprised of a flashing red or amber light, and at least one frame safety system vision light, generally comprised of a white light illuminating in a frontal direction relative to a wheelchair to which the safety, power and shade device is attached, the frame safety system caution light and the frame safety system vision light affixed to either or both of the frame horizontal and the frame upright.

5. A safety, power and shade device depending from claim 3 and further comprising:

a frame power system comprising at least one frame power system solar panel, generally comprised of a solar panel, and frame power system electrical connections and circuits generally electrically interconnected with a wheelchair electrical system providing recharging power to a wheelchair battery.

6. A safety, power and shade device depending from claim 3 and further comprising:

a frame shade system consisting of at least one frame shade panel generally comprised of a transparent, translucent or opaque plastic or cloth fabric, at least one frame shade panel connector generally comprised of a hook and loop interconnections, and at least one shade panel light or wiring aperture generally composed of apertures sized to fit around frame safety system caution lights and or frame safety system vision lights.

7. A safety, power and shade device depending from claim 3 and further comprising:

a frame safety system comprising at least one frame safety system caution light, generally comprised of a flashing red or amber light, and at least one frame safety system vision light, generally comprised of a white light illuminating in a frontal direction relative to a wheelchair to which the safety, power and shade device is attached, the frame safety system caution light and the frame safety system vision light affixed to either or both of the frame horizontal and the frame upright;

a frame power system comprising at least one frame power system solar panel, generally comprised of a solar panel, and frame power system electrical connections and circuits generally electrically interconnected with a wheelchair electrical system providing recharging power to a wheelchair battery;

a frame shade system consisting of at least one frame shade panel generally comprised of a translucent or opaque plastic or cloth fabric, at least one frame shade panel connector generally comprised of a hook and loop interconnections, and at least one shade panel light or wiring aperture generally composed of apertures sized to fit around frame safety system caution lights or frame safety system vision lights.

8. A method of deploying and storing the safety, power and shade device of claim 7 comprising:

from a position of frame deployment, rotating upwardly the frame horizontal second unit, rotating and folding the frame horizontal second unit on top of the frame horizontal first unit; disconnecting the frame upright/horizontal brace from the frame upright top member brace aperture and connecting the frame upright top member brace aperture at the frame horizontal member aperture in the frame horizontal second unit;

rotating the frame horizontal second unit and frame horizontal first unit backwardly and down to a vertical position generally parallel with the frame upright;

loosening the frame height adjustment and lowering the frame upright top member into the frame upright bottom member; and, reversing the sequence of steps for redeployment.

9. A safety, power and shade device depending from claim 1 and further comprising a wheelchair to which the safety, power and shade device is secured.

* * * * *